United States Patent [19]
Hailey

[11] Patent Number: 5,243,433
[45] Date of Patent: Sep. 7, 1993

[54] DIGITAL IMAGE INTERPOLATION SYSTEM FOR ZOOM AND PAN EFFECTS

[75] Inventor: Keith R. Hailey, Amersham, United Kingdom

[73] Assignee: Eastman Kodak Company, Rochester, N.Y.

[21] Appl. No.: 817,204

[22] Filed: Jan. 6, 1992

[51] Int. Cl.$^5$ .................... H04N 5/253; H04N 3/36
[52] U.S. Cl. ...................... 358/214; 358/213.19; 358/54
[58] Field of Search .............. 358/214, 213.19, 213.27, 358/137, 140, 180, 54, 428, 215, 216; 382/47

[56] References Cited

U.S. PATENT DOCUMENTS

| | | | |
|---|---|---|---|
| 4,134,128 | 1/1979 | Hurst | 358/22 |
| 4,163,249 | 7/1979 | Michael et al. | 358/21 R |
| 4,266,242 | 5/1981 | McCoy | 358/22 |
| 4,282,546 | 8/1981 | Reitmeier | 358/22 |
| 4,310,856 | 1/1982 | Poetsch | 358/214 |
| 4,312,017 | 1/1982 | Poetsch | 358/214 |
| 4,476,493 | 10/1984 | Poetsch et al. | 358/214 |
| 4,496,974 | 1/1985 | Heltmann | 358/140 |
| 4,611,232 | 9/1986 | Searby | 358/160 |
| 4,633,293 | 12/1986 | Powers | 358/11 |
| 4,682,227 | 7/1987 | Heerah | 358/160 |
| 4,694,345 | 9/1987 | Rodgers | 358/216 |
| 4,700,232 | 10/1987 | Abt et al. | 358/183 |
| 4,757,384 | 7/1988 | Nonweiler et al. | 358/160 |
| 4,774,581 | 9/1988 | Shiratsuchi et al. | 358/180 |
| 4,800,379 | 1/1989 | Yeomans | 340/731 |
| 4,866,520 | 9/1989 | Nomura et al. | 358/140 |
| 4,908,874 | 3/1990 | Gabriel | 382/41 |
| 4,943,856 | 7/1990 | Bakhmutsky et al. | 358/141 |
| 4,991,010 | 2/1991 | Hailey et al. | 358/140 |
| 4,991,022 | 2/1991 | Canfield et al. | 358/180 |
| 5,045,932 | 9/1991 | Sharman et al. | 358/76 |
| 5,119,082 | 6/1992 | Lumelsky et al. | 340/731 |

FOREIGN PATENT DOCUMENTS 61-20583 10/1986 Japan.
62-282378 12/1987 Japan.

OTHER PUBLICATIONS

"The Application of ASICs to the Development of a Digital Interpolator for HDTV", by Keith R. Hailey, in The Proceedings of the European Conference on the Technologies of High Definition Television, Grenoble, France, Nov. 1989.

*Primary Examiner*—Michael T. Razavi
*Assistant Examiner*—Tuan V. Ho
*Attorney, Agent, or Firm*—David M. Woods

[57] ABSTRACT

A video image alteration apparatus is described that separates the vertical and horizontal aspects of image alteration. Pixels relating to an input image derived from a frame of film are sampled at a predetermined rate related to a film scanning speed and a television line standard, and the flow of pixel information is coordinated through a memory section by write control and read control signals. A frame store, which stores image pixel data corresponding to at least one film frame, includes a line output and address inputs for selecting a line start position and a line advance increment. To obtain the aforementioned spatial separation, a line store, which is responsive to the line output of the frame store for storing at least one line of image pixel data, includes a pixel output and address inputs for selecting a pixel start position and a pixel advance increment. Lines and pixels are repeated as necessary for zoom and pan effects by appropriately addressing the frame store for vertical repeats and the line store for horizontal repeats. New image pixels are then generated by a spatial interpolator responsive to the pixel output of the line store.

6 Claims, 5 Drawing Sheets

SYSTEM INCORPORATING SEPARATE LINE STORE

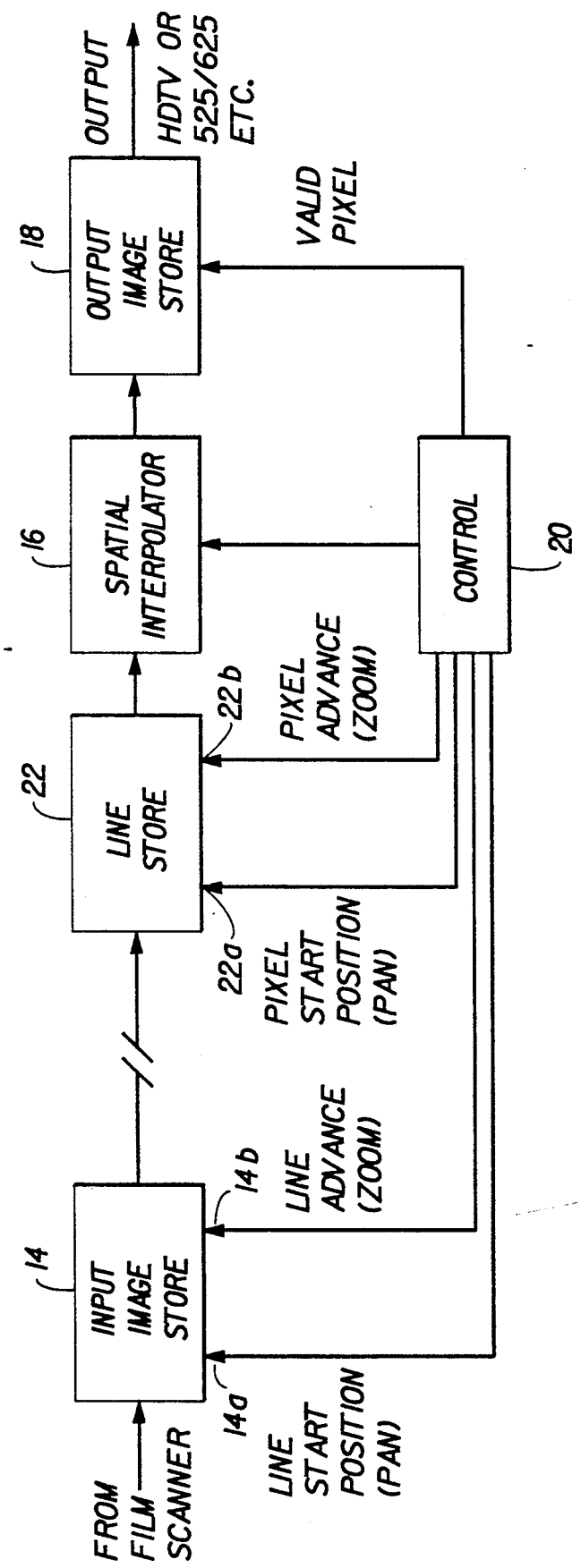
FIG.5 SYSTEM INCORPORATING SEPARATE LINE STORE

DIGITAL IMAGE INTERPOLATION SYSTEM FOR ZOOM AND PAN EFFECTS

BACKGOUND OF THE INVENTION

1. Field of the Invention

This invention relates to the field of digital processing of image data, particularly to obtain the effect of an image alteration.

2. Background Art

A known signal processing channel for use in a telecine film scanner for altering the size and orientation of a video image is shown in block form in FIG. 1. (As hereinafter used, a size alteration effected by vertical and/or horizontal enlargement or expansion will be called zooming; an orientation alteration effected by side-to-side or up and down movement will be called panning.) A film scanner 10 develops image pixel data corresponding to image pixel areas on a motion picture film. The signal processing channel comprises an analog-to-digital(A/D) converter 12, an input image store 14, a spatial interpolator 16, and an output image store 18. A controller 20 provides system timing for pipelined operation according to the scanning speed of the film scanner 10 and the television standard in use. Film pixel data from the film scanner 10 is converted to digital pixel data by the A/D converter 12 and applied to the input image store 14 at a real-time, synchronous rate determined by the controller 20.

In normal operation, i.e., without zooming or panning, active lines are selected from the input store 14 by the controller 20 and passed unmodified as to size or orientation to the output inage store 18 via the spatial interpolator 16. In performing a zoom operation, as shown in FIG. 2, a new output image is derived from a limited amount of input data. In order to maintain the required data rate in number of lines and pixels, the new output image data is interpolated from the input data in the spatial interpolator 16. The channel data rate is maintained at the level required for pipelined operation by controlling the readout of the input image store 14. Over the active portion a (see FIG. 2) of the input image, lines and pixels are repeated as necessary for optimum interpolation of the new output data.

A simple example for a 2:1 zoom ratio is given in FIG. 3. Line A shows original input pixels from the portion a (see FIG. 2) of the full input image produced according to the system timing illustrated in Line C. Line B illustrates the output pixels needed (for a 2:1 zoom) from the active portion a to produce a full-sized output image (see FIG. 2). Thus, Lines A and B represent the spatial relationship between the original input and "zoomed-in" pixels, respectively. Zooming is obtained by writing into the input store 14 at the synchronous rate represented by the Line C timing, and then controlling readout of the input store so as to repeat samples in its output. In the example of FIG. 3, this is done by advancing the read address for every other input clock, as shown by Line F, thereby repeating pixels as shown in Line D. The repeated pixels are then subjected to, e.g., a linear interpolation in the spatial interpolator 16. The interpolated pixels are shown in Line E relative to the synchronous timing of Line C. In accordance with a simple linear interpolation, output (repeat) pixel B will be the average of input pixels N and N+1, (repeat) pixel D the average of input pixels N+1 and N+2, and so on. For other zoom ratios, the control pulses and repeat line/pixel sequences are more complex but the same principles apply. An example for 1.33:1 zoom is given in FIG. 4.

In addition to zooming, it is often desirable to pan the image side-to-side or up and down to position the zoomed area of interest. Obtaining all of these effects necessitates a random access design for the input store 14, which is an undesirable complication for a pipelined operation.

SUMMARY OF THE INVENTION

To produce a design that is more amenable to pipelined operation, it is beneficial to separate the vertical and horizontal aspects of image alteration. More particularly, a video image alteration apparatus is described wherein pixels relating to an input image derived from a frame of film are sampled at a predetermined rate related to a film scanning speed and a television line standard, and wherein the flow of pixel information is coordinated through a memory section by write control and read control signals. The apparatus includes a frame store for storing image pixel data corresponding to at least one film frame, the frame store having a line output and address inputs for selecting a line start position and a line advance increment. To obtain the aforementioned spatial separation, a line store responsive to the line output of the frame store is provided for storing at least one line of image pixel data, the line store having a pixel output and address inputs for selecting a pixel start position and a pixel advance increment. New image pixels are generated by a spatial interpolator responsive to the pixel output of the line store.

Lines and pixels are repeated as necessary for optimum interpolation by appropriately addressing the frame store for vertical repeats and the line store for horizontal repeats, as follows:

(a) a line start position control signal is provided to the line start address input of the frame store to select the vertical pan position of the line output signal, (b) a line advance control signal is provided to the line advance address input of the frame store to select the vertical repeat pattern of the line output signal, (c) a pixel start position control signal is provided to the pixel start address input of the line store to select the horizontal pan position of the pixel output signal, and (d) a pixel advance control signal is provided to the pixel advance address input of the line store to select the horizontal repeat pattern of the pixel output signal.

BRIEF DESCRIPTION OF THE DRAWINGS

The prior art and the invention will be described with reference to the drawings, wherein

FIG. 5 is a block diagram of a video image interpolation apparatus incorporating a separate line store in accordance with the invention.

DESCRIPTION OF THE PREFERRED EMBODIMENT

Figure 1:
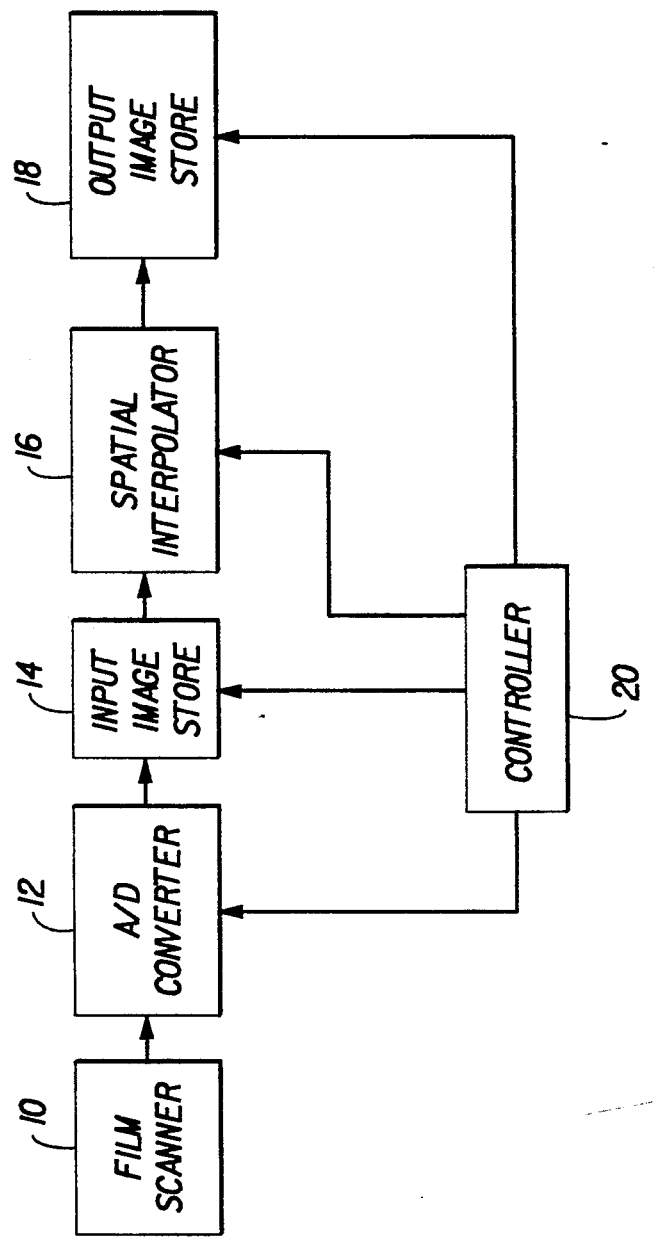
FIG. 1 is a block diagram of a known signal processing channel.

FIG. 5 shows the signal processing channel of a digital image interpolation system incorporating a separate line store 22 in accordance with the invention. System components already described in relation to the preceding figures have been given the same reference characters. A preferred film scanner 10 is described in U.S. Pat. No. 5,045,932, "Method and Apparatus for Generating A High Definition Electronic Image Signal from a Line Scan of a Color Original," which is incorporated herein by reference. The store 14 is capable of storing all of the pixels of a complete film frame. Since a preferred application, as set forth in the aforementioned '932 patent, is for generation of effects in connection with a HDTV signal, about 1600 lines of film information are stored when scanning a 35mm Academy format motion picture film. This is more than the 1035 active lines which are required for the proposed 1125 line HDTV standard because of the aspect ratio difference of the film and HDTV systems.

The input image store 14 includes a line start input 14a and a line advance input 14b for receiving a line start position signal and a line advance signal, respectively, from the controller 20. The line start signal controls the upper line position and the lower line position of the active area a (see FIG. 2), while the line advance signal controls the vertical repeat pattern (i.e., the vertical zoom ratio) of the input lines. The line store 22 includes a pixel start input 22a and a pixel advance input 22b for receiving a pixel start position signal and a pixel advance signal, respectively, from the controller 20. The pixel start input signal controls the left pixel position and the right pixel position of the active area a (see FIG. 2), while the pixel advance signal controls the horizontal repeat pattern (i.e., the horizontal zoom ratio) of the input pixels.

Figure 2:
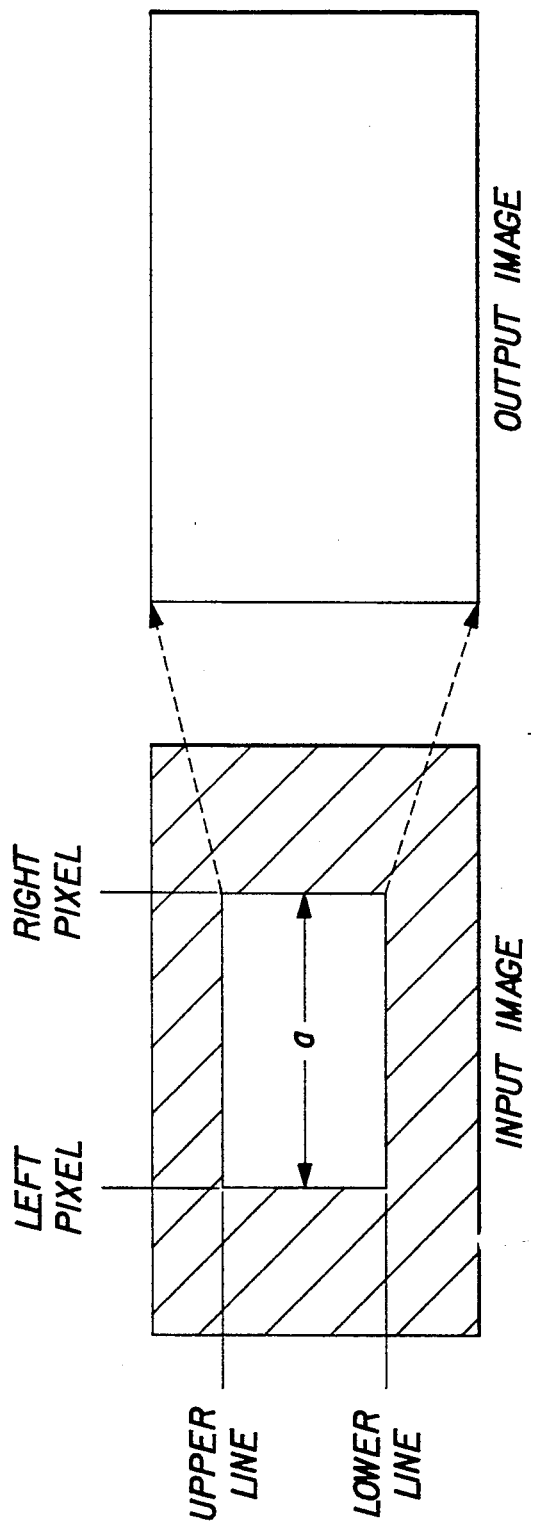
FIG. 2 is an illustration useful in understanding zoom and pan effects in connection with an image frame.
Figure 3:
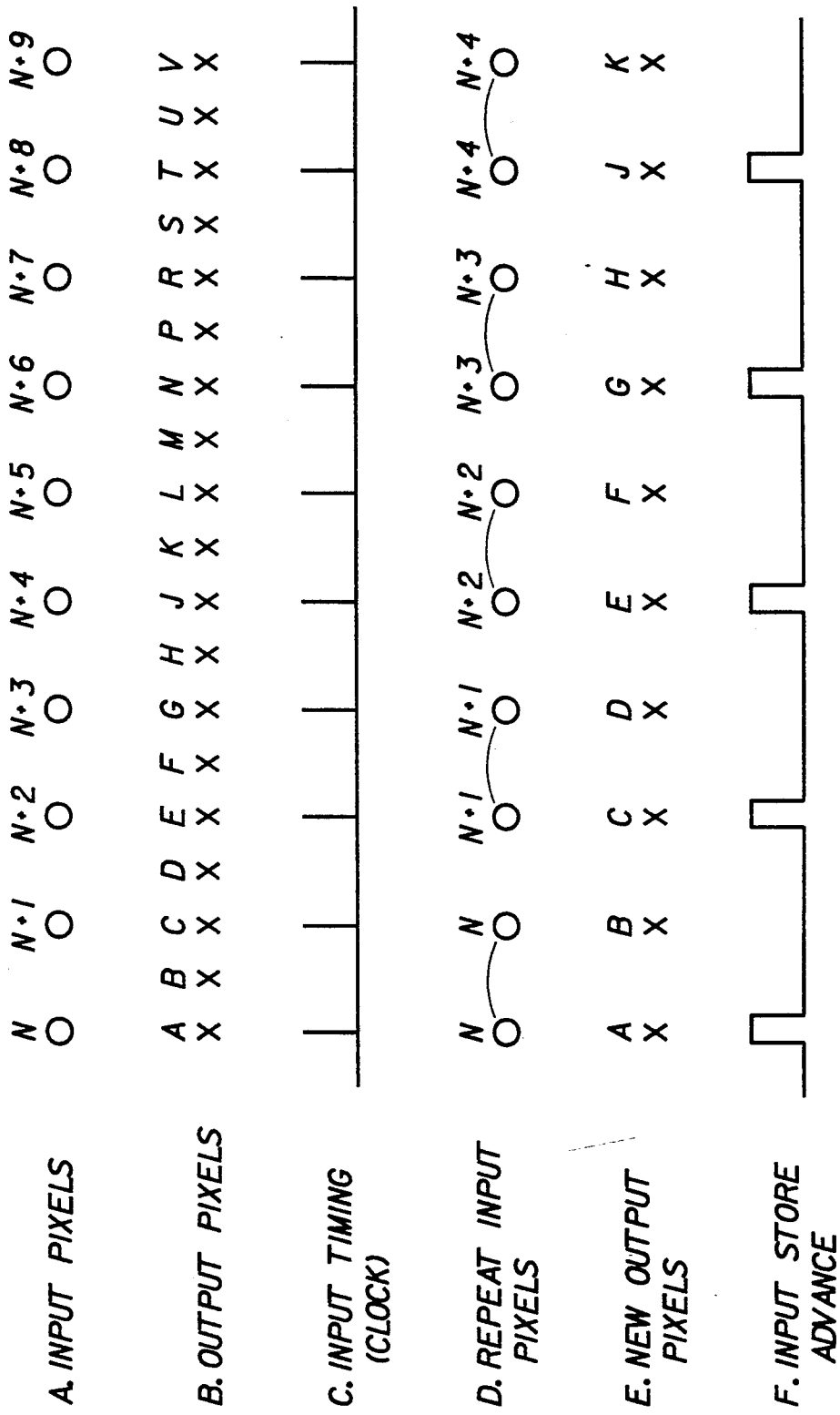
FIG. 3 is a timing diagram for a 2:1 zoom obtained in the channel of FIG. 1.
Figure 4:
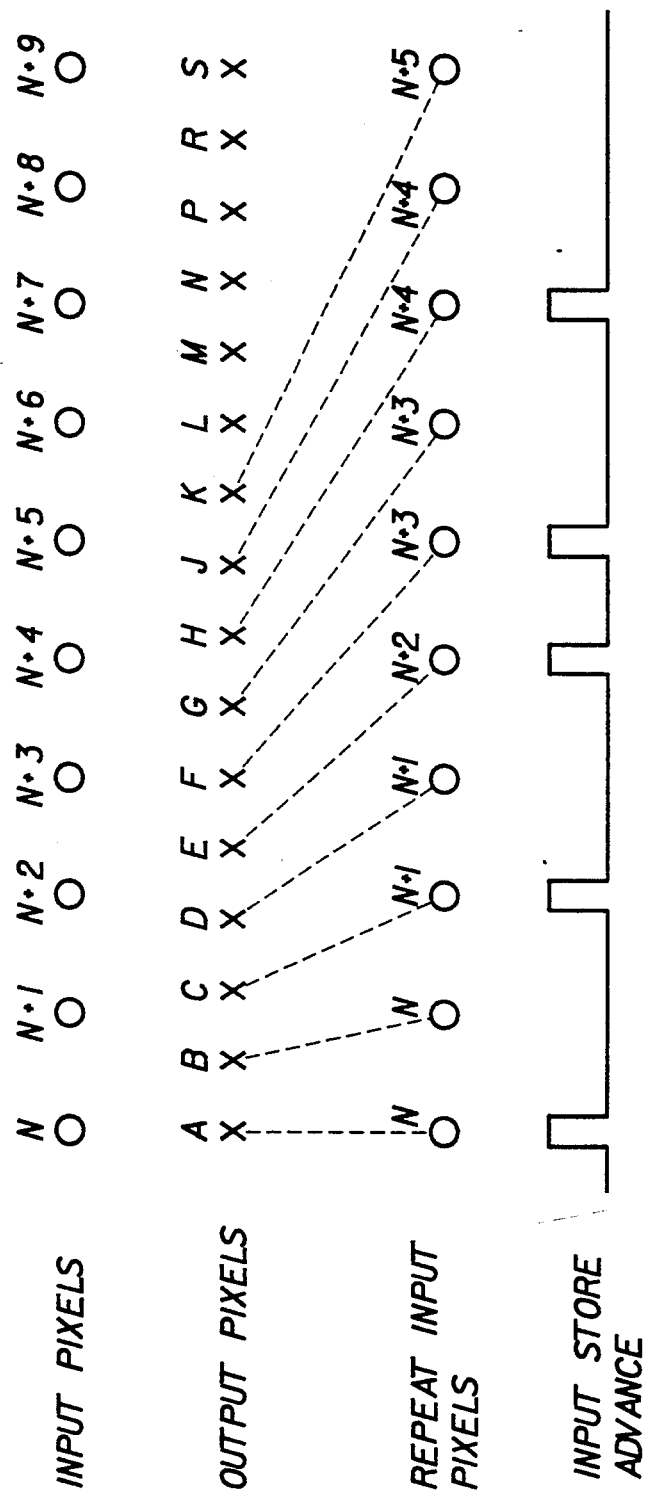
FIG. 4 is a timing diagram for a 1.33:1 zoom obtained in the channel of FIG. 1.

In normal operation, i.e., without zooming or panning, 1035 active lines are selected from the input store 14 by the controller 20 and passed through the line store 22 unmodified as to size or orientation to the output image store 18. In performing a zoom operation, as shown in FIG. 2, a new output image is derived from a limited amount of input data. In order to maintain the required data rate in number of lines and pixels, the channel data rate is maintained at the level required for pipelined operation by controlling the readout of the input image store 14 and the line store 22. Over the active portion a (see FIG. 2) of the input image, lines and pixels are repeated as necessary for optimum interpolation of the new output data. In particular, panning is controlled in two stages, as follows. The vertical (up and down) pan position is controlled by selecting the upper and lower line positions of the zoomed image (see FIG. 2) by inputting the appropriate upper and lower line addresses to the line start input 14a of the input image store 14. The horizontal (side-to-side) pan position is controlled by selecting the left and right pixel positions of the zoomed image (see FIG. 2) by inputting the appropriate left and right addresses to the pixel start input 22a of the line store 22. Similarly, the vertical and horizontal line repeats (i.e., the vertical and horizontal zoom ratios) are controlled in two stages, as follows. The vertical line advance is controlled by specifying the vertical line repeat to the line advance input 14b of the input image store 14. This sets the number of times each line is repeated within the active area a (e.g., twice for a 2:1 vertical zoom ratio). The horizontal pixel advance is controlled by specifying the pixel repeat to the pixel advance input 22b of the line store 22. This sets the number of times each pixel is repeated within the active area a (e.g., twice for a 2:1 horizontal zoom ratio).

Storing the complete input image in the input image store 14 and selecting the required image data by proper addressing of the input image store 14 and the line store 22 allows for optimum interpolation of output data using a matrix of input pixels. For the HDTV scanning system described in the aforementioned '932 patent, it is desirable to have the spatial interpolator 16 perform an $8 \times 8$ array implementing an adjustable finite impulse response function. Further information about such an FIR function may be found in "The Application of ASICs to the Development of a Digital Interpolator for HDTV", by Keith R. Hailey ("The Proceedings of the European Conference on the Technologies of High Definition Television" held by the See in Grenoble, France in November 1989).

While not an integral part of this invention, it is beneficial if the spatial interpolator 16 can also be used in television standards conversion, in particular, to decimate an input sequence of higher definition signals into an output sequence of lower definition signals. A suitable decimation filter is described in U.S. Pat. No. 4,991,010, entitled "Dual-mode Image Interpolation Filter Operable in a First Mode for Storing Interpolation Coefficients and in a Second Mode for Effecting Television Standards Conversion at a Pixel Rate", which is incorporated herein by reference. If this capability is provided in the spatial interpolator 16, then it is necessary to provide a valid pixel signal from the controller 20 to the output image store 18 in order to identify the wanted output pixels. If decimation is not employed, basically all of the output pixels are valid.

What is claimed is:

1. In a video image alteration apparatus wherein pixels relating to an input image derived from a frame of film are sampled at a predetermined rate related to a film scanning speed and a television line standard, and wherein a flow of pixel information is coordinated through a memory section by write control and read control signals, the combination comprising:
   means for storing image pixel data corresponding to at least one film frame, said frame storing means having a line output and line start and line advance address inputs for selecting a line start position and a line advance increment;
   means responsive to the line output of said frame storing means for storing at least one line of image pixel data, said line storing means having a pixel output and pixel start and pixel advance address inputs for selecting a pixel start position and a pixel advance increment;
   a spatial interpolator responsive to the pixel output of said line storing means; and
   means for generating read control signals for said frame storing means and said line storing means, said generating means providing:
   (a) a line start position control signal to the line start address input of said frame storing means to select the vertical pan position of the line output signal,
   (b) a line advance control signal to the line advance address input of said frame storing means to select the vertical repeat pattern of the line output signal,
   (c) a pixel start position control signal to the pixel start address input of said line storing means to select the horizontal pan position of the pixel output signal, and (d) a pixel advance control signal to the pixel advance address input of said line storing means to select the horizontal repeat pattern of the pixel output signal.

2. Apparatus as claimed in claim 1 wherein said frame storing means, said line storing means and said spatial interpolator receive pixel image data at a rate determined by the write control signal to thereby obtain a pipelined mode of operation.

3. Apparatus as claimed in claim 1 wherein said spatial interpolator operates on a matrix of pixel image data obtained from said line storing means.

4. Apparatus as claimed in claim 3 wherein said matrix is a two-dimensional array of pixel image data.

5. Apparatus as claimed in claim 4 wherein said matrix is an 8×8 array of pixel image data.

6. Apparatus as claimed in claim 1 wherein the television line standard is a high definition standard and wherein said alteration apparatus further includes an output image store connected to an output of said spatial interpolator, said spatial interpolator including a decimation filter for converting an input sequence of high definition pixel image data into an output sequence of low definition pixel image data to thereby obtain television standards conversion, said read control signal generating means further providing a valid pixel signal to said output image store to select said output sequence of pixel image data.

* * * * *